US006907033B2

United States Patent
Faccin (12) United States Patent
(10) Patent No.: US 6,907,033 B2
(45) Date of Patent: Jun. 14, 2005

(54) APPARATUS, AND ASSOCIATED METHOD, FOR PROVIDING ROUTER ADVERTISEMENT INFORMATION TO A MOBILE NODE IN A RADIO IP SYSTEM

(75) Inventor: Stefano Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 514 days.

(21) Appl. No.: 10/196,457

(22) Filed: Jul. 16, 2002

(65) Prior Publication Data

US 2004/0013111 A1 Jan. 22, 2004

(51) Int. Cl.[7] .............................................. H04L 12/66
(52) U.S. Cl. ...................... 370/352; 370/389; 370/386; 455/436; 455/437
(58) Field of Search ................................ 370/351, 352, 370/389, 386, 395.52, 315, 331, 332; 455/436, 437, 439, 440, 433, 445, 435.1, 435.2

(56) References Cited

U.S. PATENT DOCUMENTS 6,073,016 A * 6/2000 Hulthen et al. .......... 455/435.2
6,771,962 B2 * 8/2004 Saifullah et al. ............ 455/436
2002/0126665 A1 * 9/2002 Ueno ......................... 370/389

FOREIGN PATENT DOCUMENTS

EP          1239631         9/2002 ........... H04L/12/28

OTHER PUBLICATIONS

Tönjes, R. et al. "Multi–Access: The Key Driver Beyond 3G" In: International Symposium 3G Infrastructure and Services, Athens, Jul. 2–3, 2001, see section IV., B.

* cited by examiner

Primary Examiner—Wellington Chin
Assistant Examiner—Raj Jain
(74) Attorney, Agent, or Firm—Robert M. Bauer (57) ABSTRACT

Apparatus, and an associated method, for providing a mobile node with identifying indicia used to create a care/of address identifying the location of the mobile node. A router advertisement is generated by an access router. The router advertisement includes identifying indicia identifying the identity of the sub-network at which the access router is located. A detector detects the identifying indicia. A broadcast selector selectably broadcasts the identifying indicia to the mobile node. The mobile node utilizes the identifying indicia to form the care/of address.

32 Claims, 4 Drawing Sheets

APPARATUS, AND ASSOCIATED METHOD, FOR PROVIDING ROUTER ADVERTISEMENT INFORMATION TO A MOBILE NODE IN A RADIO IP SYSTEM

The present invention relates generally to a manner by which to broadcast router advertisement information to a mobile node in a radio IP (Internet Protocol), or other packet-based, communication system. More particularly, the present invention relates to apparatus, and an associated method, by which to broadcast, upon a radio link defined in the radio IP system, sub-network identifying indicia, such as IP-prefix identifiers to a mobile node. The IP-prefix identifiers, or other sub-network identifying indicia, are used by a mobile node to form a care/of address used to permit routing of packet data to the mobile node when the mobile node is attached to a visited sub-network. Broadcasts are effectuated without necessitating changes to existing routers, and the broadcasts are also effectuated in manners that do not appreciably increase the radio resources required to effectuate the communication of such information.

BACKGROUND OF THE INVENTION

Advancements in communication technologies have permitted the introduction, and popular usage, of new types of communication systems. As a result of such advancements, for example, significant increases in the rates of data transmission have been made possible and new types of communication services, utilizing the increased rates of data transmission, have been permitted. Advancements in digital communication techniques are amongst the advancements in communication technologies that have permitted the introduction of new types of communication services.

A radio communication system is exemplary of a type of communication system that has benefited from advancements in communication technologies and, also, the use of digital communication techniques. In a radio communication system, at least a portion of a communication path formed during communications therein includes a radio-link. Communications effectuated upon the communication path are effectuated with one or more mobile nodes at which, e.g., the communications are originated or terminated.

Improved communication mobility is inherently provided in a radio communication system due to use the radio link upon which the communication path is formed. Wire lines, otherwise required upon which to form the communication path, are obviated. And, due to the increased communication mobility, communications are effectuable pursuant to a radio communication system, from, and between, locations at which the use of a conventional, wireline communication system would be impractical or unfeasible.

Digital communication techniques have been utilized in radio, as well as other types of, communication systems. Digital communication techniques, generally, increase the efficiency of communication of information relative to conventional, analog communication techniques. In a digital communication technique, information that is to be communicated is digitized. And, once digitized, the digitized information is formatted in to, for instance, data packets. The data packets are communicated, either individually or in groups, to a destination. Once received at the destination, the packets of data are concatenated together to recreate the information content of the information of which the data packets are formed.

Communications effectuated by way of the world-wide web (WWW) are effectuated by packet-based communications. Content retrieval, as well as other communication services, are regularly effectuated between a content provider and a recipient station, typically a computer terminal. The computer terminal and the content provider are typically connected by way of wireline connections with the Internet backbone.

Protocols have been developed, and protocols have been standardized, that relate to packet-based communications. The Internet Protocol (IP) is exemplary of a standard, packet-based communication standard regularly utilized to effectuate packet-based communications. Standards relating to the Internet Protocol include, e.g., the IPv4 and IPv6 versions. In these versions of the Internet Protocol, operational parameters as well as the logical configuration of the IP network are defined.

For instance, sub-networks are defined. Each sub-network is identified by a prefix value, and the IPv4 and IPv6 define the nomenclatures of the prefixes that identify such sub-networks. Communication stations forming nodes of a sub-network are defined by the same prefix that identifies the associated sub-network.

When the node forms a fixed, wire line device connected by a wire line connection with other parts of the Internet backbone, the node is always identified, in part, by the prefix that identifies the sub-network with which the node is associated.

Increasingly, packet-based communications, including communications effectuated by way of the world-wide-web, are effectuated with mobile nodes rather than fixed nodes. The prefix identifying the mobile node does not necessarily, and quite regularly does not, identify the physical location of the node. Usage of mobile nodes by which to receive, or send, packet-based data requires the definition of home agents and care of (C/O) addresses. Use of C/O addresses provide temporary identifiers identifying temporary physical locationing of mobile nodes. A home agent identifies a home address, i.e., home sub-network, associated with the mobile node. The C/O address identifies a temporary, or visited, location, i.e., visited sub-network, of the mobile node. When data is to be communicated to the mobile node, the packet data is addressed, and routed to, the home agent. By providing the home agent with the identity of the C/O address, the packet data is re-routable to the C/O address and the mobile node located in the visited network associated therewith.

An access router is associated with each sub-network. And, in a radio IP network, an access router is associated with each access network of the radio IP network. Each access network defines a sub-network, identified by a particular IP-prefix identifier. The access router is operable, amongst other things, to generate router advertisements. Router advertisements include indicia of the prefix identifying the sub-network with which the access router is associated, and the address configuration information that indicate to a mobile node how to create IP addresses. Such address configuration information is needed to allow the mobile node to know what rules to use to create the address such as, e.g. stateless autoconfiguration vs. stateful autoconfiguration, etc.

When a mobile node roams into a visited sub-network, the mobile node must be able to obtain the indicia of the prefix identifying the visited sub-network into which the mobile node has roamed and is now associated and the address configuration information.

Such prefix and the address configuration information are used to create the C/O address of the mobile node. The C/O address is provided to the home agent of the home network of the mobile node, thereafter to be used to route packet data to the mobile node in its visited sub-network. The C/O address is formable in any of various manners, e.g., a stateless manner or a stateful manner. Therefore, for the C/O address to be formed, the mobile node must receive the information contained in the appropriate router advertisement.

When the mobile node is operable in a cellular communication system, system information is broadcast throughout an area to provide address configuration information, IP-prefix identifier information, and other information to mobile nodesSystem information is broadcast, e.g., at selected intervals. Pages are also broadcast to inform a designated mobile node of incoming communication. The terms paging area, access network area, and routing area shall all be used herein to refer to areas over which information is broadcast. In a cellular communication system, such areas are defined, usually to identify an area defined by one, or typically, a group, of cells. System information is broadcast throughout all of the cell, or cells, of the paging area. A mobile node operable in the cellular communication system is tuned to a broadcast channel defined upon which the system information is broadcast throughout the access network area. Cellular communication systems further generally define an RRM (radio resource manager) and, the RRM manages various operations, including system information broadcast functions by which system information are broadcast throughout access network areas.

As standards relating to radio IP networks have developed, access routers are generally associated with particular radio access networks so that a radio access network forms a sub-network of a packet-data network. If a manner could be provided by which to utilize the system information broadcast procedures used in conventional cellular communication system operations also to provide router advertisement information to a mobile node, care/of addresses could be created by the mobile node.

A manner by which to broadcast router advertisement information to mobile nodes operable in a radio IP communication system is needed so that the mobile nodes, when attached to a visited sub-network, shall be able to form care/of addresses. Utilizing existing system information broadcast procedures to effectuate the broadcast of the information would provide a convenient, non-disruptive manner by which to provide the information to a mobile node.

It is in light of this background information related to the broadcast of router advertisement, or other system, information in a radio IP, or other packet-based, communication system that the significant improvements of the present invention have evolved.

SUMMARY OF THE INVENTION

The present invention, accordingly, advantageously provides apparatus, and an associated method, by which to broadcast router advertisement information to a mobile node in a radio IP (Internet Protocol), or other packet-based, radio communication system.

Through operation of an embodiment of the present invention, a manner is provided by which to broadcast, upon a radio link defined in the radio IP system, sub-network identifying indicia, such as IP-prefix identifiers, address configuration information, and other system information to a mobile node. The IP-prefix identifiers, or other sub-network identifying indicia, the address configuration information, and other system information are used by a mobile node to form a care/of address. Broadcasts of the router advertisement information are effectuated in manners to communicate the informational content thereof to the mobile nodes while limiting the amount of radio resources needed to effectuate the broadcast of the router advertisement information.

Router advertisement information is sent, e.g., to mobile nodes together with other broadcast information conventionally broadcast to mobile nodes operable in a cellular communication system. The mobile nodes use routing advertisement indicia and address configuration information to form care/of (C/O) to identify to where packet data to be delivered to the mobile node is to be routed when the mobile node is in, or becomes attached to, a visited sub-network.

In one aspect of the present invention, a radio resource manager defined in a radio access network of the radio IP communication system is coupled to receive routing advertisements generated by an access router. The access router associated with a particular sub-network is configured to send the routing advertisement only to the radio resource manager. The radio resource manager selects when the routing advertisement is broadcast upon radio links to mobile nodes within a designated access network area.

In another implementation, the radio resource manager is again coupled to receive routing advertisements generated by an access router. The access router again is configured to send the router advertisement only to the radio resource manager. The radio resource manager extracts identity indicia from the routing advertisement. The extracted information is broadcast upon a broadcast channel to mobile nodes positioned within an access network area controlled by the radio resource manager. The extracted information includes, e.g., prefix indicia defined in the IPv4 and IPv6 standard protocols and address configuration information.

In these and other aspects, therefore, apparatus, and an associated method, is provided for a packet-based radio communication system having a radio access network including a radio resource manager. An access router is coupled to the radio resource manager of the radio access network. The access router generates an access router-generated signal containing indicia identifying the at least the portion of the first radio access network. The radio resource manager detects indicia contained in the router advertisement and, responsive thereto, selectably causes broadcast of the indicia throughout at least a first area to be detectable by a mobile node positioned within the area. The mobile node is thereby provided with the indicia to be used thereat in the creation of a temporary address identifying the mobile node to be used to communicate packet data thereto.

A more complete appreciation of the present invention and the scope thereof can be obtained from the accompanying drawings, which are briefly summarized below, the following detailed description of the presently preferred embodiments of the invention, and the appended claims.

DETAILED DESCRIPTION

Figure 1:
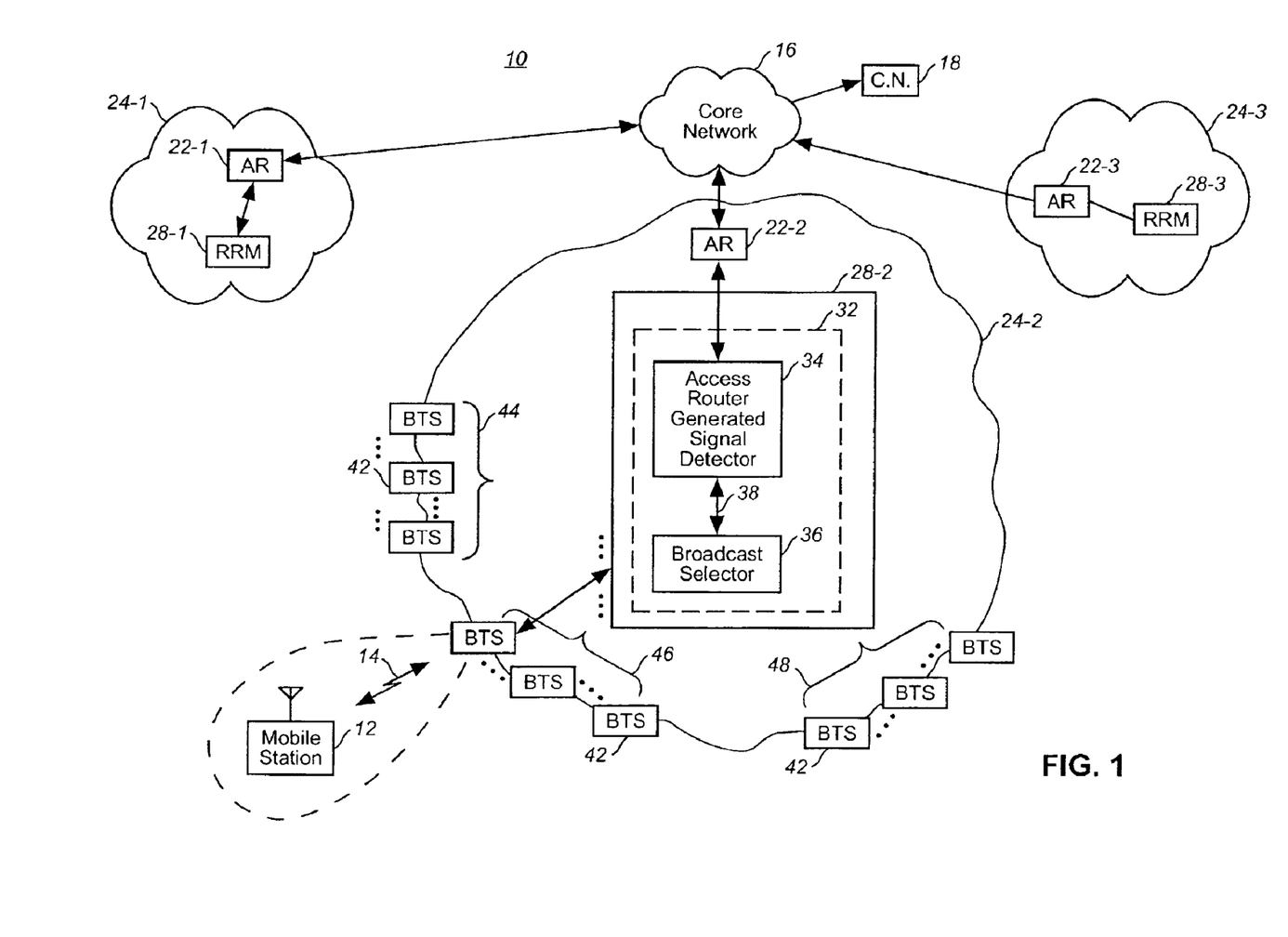
FIG. 1 illustrates a functional block diagram of a packet-based, radio communication system in which an embodiment of the present invention is operable.

Referring first to FIG. 1, a communication system, shown generally at 10, is operable to communicate packet-formatted data with mobile nodes, of which a single mobile node (MN) 12 is shown in the figure. The packet-formatted data is communicated with the mobile node by way of radio links 14. In the exemplary implementation, the communication system forms an IP (Internet Protocol) communication system operable, e.g., pursuant to IPv4 or IPv6 protocols. While the following description shall be described with respect to the exemplary implementation in which the communication system forms a radio IP communication system, it should be understood that the teachings of the present invention can analogously be implemented in any of many other types of packet-based radio communication systems. And, while the communication system, and the elements forming the communication system, are functionally represented, the functional elements shown here to form the communication system can be implemented in any desired manner, not only as-shown, but also in other manners.

The communication system includes a core IP network 16 to which various communication devices, of which the correspondent node 18 is exemplary, are coupled. Access network routers (ARs) are also coupled to the Internet backbone. Each access router defines a sub-network. For instance, the left-most (as shown) access router 22 defines a first sub-network 24-1, a center (as shown) access router 22-2 defines a second sub-network 24-2, and a right-most (as shown) access router 22-3 defines a third sub-network 24-3. Other access routers and corresponding sub-networks can analogously also be represented. And, while not separately shown, the correspondent node forms a node in another sub-network, defined by another access router.

Each of the sub-networks also defines a radio access network (RAN). The radio access networks, in the exemplary implementation, are co-terminous with the sub-networks 24 and shall be commonly referenced herein. Each of the radio access networks includes a radio resource manager 28. Here, the left-most radio access network 24-1 includes a radio resource manager (RRM) 28-1, the center-most (as shown) radio access network 24-2 includes a radio resource manager 28-2, and the right-most (as shown) radio access network 24-3 includes a radio resource manager (RRM) 28-3. The radio resource managers 28 are operable, inter alia, to manage, and otherwise control, radio resources of the radio access networks with which the radio resource managers are associated. The radio resource managers of the respective radio access networks/sub-networks 24 are coupled to corresponding access routers of the sub-networks/radio access networks.

The radio resource managers include apparatus 32 of an embodiment of the present invention. Here, the radio resource manager 28-2 is shown to include the apparatus 32 of an embodiment of the present invention. While not separately shown, others of the radio resource managers 28 also include the apparatus 32. The elements shown to form portions of the apparatus 32 are functionally represented. While, in the exemplary implementation, the elements are implemented, in part, as algorithms executable by processing circuitry, the functions provided by such elements are implementable in any desired manner.

Here, the apparatus 32 is shown to include an access router-generated signal detector 34 and a broadcast selector 36. The access router-generated signal detector is operable to detect router advertisements generated by at least the access router located at the radio access network at which the radio resource manager is located. The router advertisements include indicia identifying the sub-network defined by the access router and address configuration information. Other system information can also be embodied in the router advertisements. In an IP-based system, the identifier identifies prefixes of identifiers, and address configuration information provide information on how to create the IP addresses. In an IPv4 protocol scheme, the prefix values identified in the router advertisement include the two left-most identifiers. For instance, if an IP address, identifying a node is 128.132.10.2, the router advertisement includes the 'prefix' digits 128 and 132. The detector 34 detects such values. Indications of such detections are provided by way of the line 38 to the broadcast selector 36.

Each of the radio access networks 24 includes a plurality of base transceiver stations 42. The base transceiver stations 42 each define cells 44. The cells 44 define coverage areas within which communications with the base transceiver station that define such cells are permitted when a mobile node is positioned therein. Groups of the base transceiver stations define cellular areas collectively forming access network areas. In the radio access network 24-2, the base transceiver stations 42 are grouped into three groups, Group 44, Group 46, and Group 48, defining first, second, and third access network areas, respectively.

The radio resource manager 28-2 is coupled to the base transceiver stations 42 of the respective access network areas. Other radio resource managers of the other radio access networks analogously are coupled to the base transceiver stations positioned at the respective other radio access networks. The radio resource manager is operable to control broadcast of system information upon broadcast channels in the respective ones of the access network areas. And, here, the broadcast selector 36 is operable pursuant to an embodiment of the present invention to cause the system information communicated upon the broadcast channels at the respective access network areas to include the indicia detected by the detector 34. That is, the broadcast selector causes the signals communicated upon the broadcast channels of the respective access network areas to include the prefix identifiers identifying the sub-network 24 at which the base transceiver stations are located. When a mobile node tunes to the broadcast channel, the mobile node detects the broadcast information that includes the prefix identifier identifying the sub-network at which the base transceiver stations are located, the address configuration information, and any other system information, as appropriate. Thereby, the apparatus 32 facilitates the providing, in a controlled manner, the identity indicia identifying the sub-network in which the mobile node is located and the address configuration information.

The RRM may provide the information according to a selected scheme. For example, the information is provided at selected intervals, e.g., once every twenty seconds, or on an as-needed basis. In the exemplary implementation, not all of the information the router advertises is broadcast and the information is not broadcast at the same frequency the router advertises them.

Through operation of an embodiment of the present invention, the apparatus 32 of an embodiment of the present invention selectably provides the indicia identifying the sub-network at which the mobile node is attached, the address configuration information, and any other appropriate system information. The identifying indicia and the address configuration information are provided in a controlled manner upon broadcast channels, here together with system information generated during conventional operation of the radio access network. Radio resources upon the radio link are conserved while also providing the mobile node with information required of the mobile node to form a care/of (C/O) address to permit routing of packet data thereto as the mobile node roams throughout the communication system. In the exemplary positioning shown in the figure, the mobile node is positioned within a cell 44 forming part of the second access network area (PA2) of the radio access network 24-2. The broadcast selector 36 of the apparatus 32 causes the system information broadcast upon the broadcast channel within the second access network area to include indicia identifying both the access network area (PA2), the prefix identifying the sub-network 24-2, and the address configuration information to be used in sub-network 24-2. Such information is used at the mobile node to define a C/O address to the home network associated with the mobile node 12. The C/O address is accessible by the home agent of the home network of the mobile node. When packet data is to be communicated to the mobile node, the packet data is delivered to the home network of the mobile node and then re-routed to the C/O address identified by the C/O address obtained pursuant to an embodiment of the present invention.

In a first exemplary implementation, therefore, the router prefix part of the router advertisement and the address configuration information generated by the access router 22-2 is detected by the detector and caused by the broadcast selector to be advertised together with a access network area identifier upon the radio link 14. The broadcasted information besides the regular broadcast information in the wireless system is, for instance, the concatenation of the router prefix value and an access network area identifier, plus the address configuration information. When the mobile node tunes to the broadcast channel, the mobile node need only check whether the part of the received information regarding the access network area identifier has changed. The access network area identifier changes when the mobile node travels out of one access network area and into another access network area. The separate access network areas are formed at a single radio access network or, conversely, are located in separate radio access networks. The mobile node can also check whether the part of the received information regarding the prefix of the router has changed. The prefix of the router and the address configuration information change when the mobile node travels between successive radio access networks and, when doing so, the mobile node performs both an access network area update and a binding update procedure.

In another implementation, only the access network area identifier is sent upon the broadcast channels. When only the access network area identifier is sent upon the broadcast channels, the mobile node verifies whether the access network area identifier has changed. If so, an access network area update procedure is performed. During the access network area update procedure, the address configuration and the prefix of the router advertisement is provided to the mobile node. Thereafter, the mobile node decides whether a binding update procedure is required to be performed.

Figure 2:
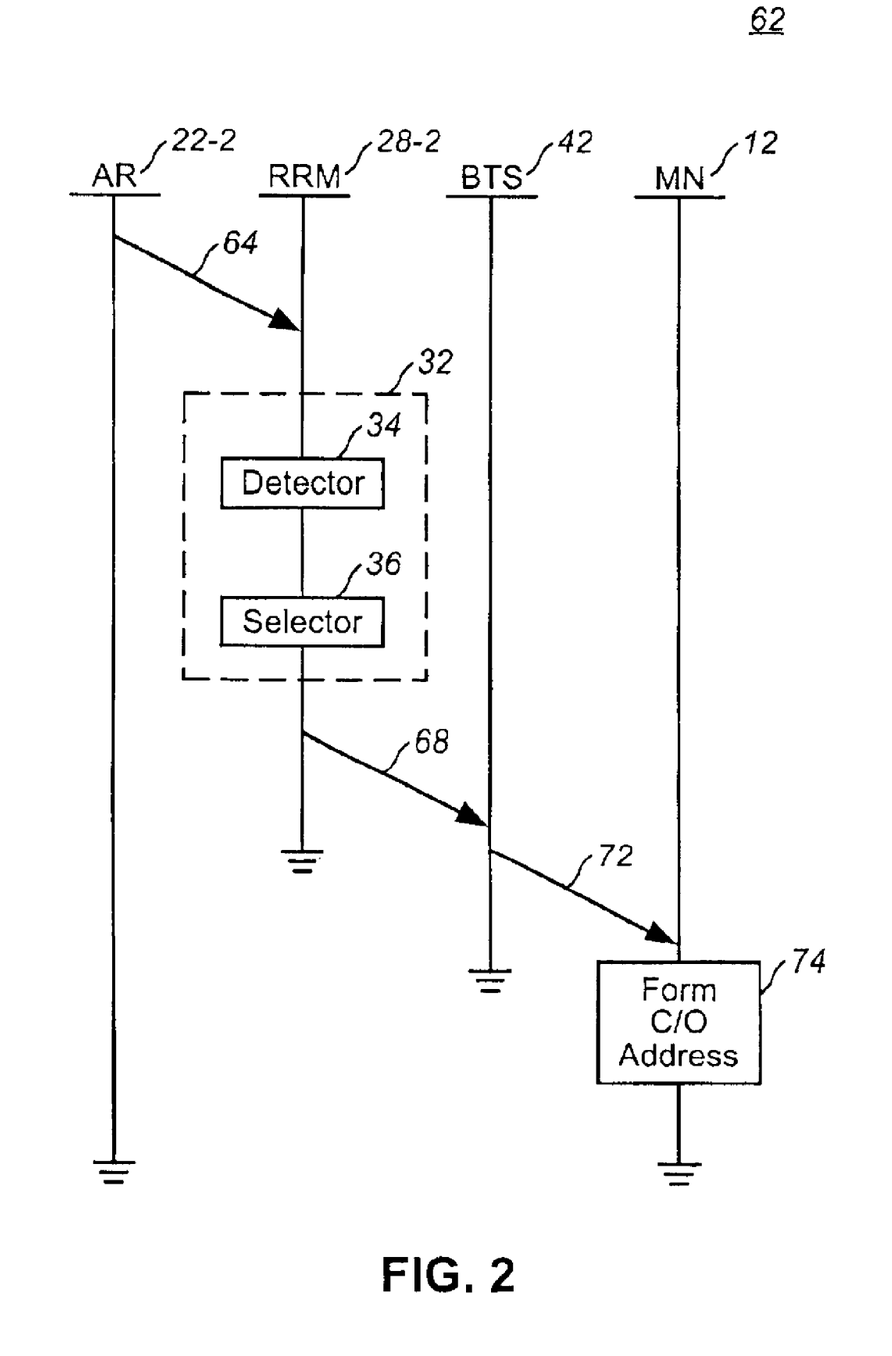
FIG. 2 illustrates a message sequence diagram listing signaling generated during operation of the communication system shown in FIG. 1 pursuant to an embodiment of the present invention.

FIG. 2 illustrates a message sequence diagram, shown generally at 62, representative of signaling generated during operation of an embodiment of the present invention. Here, router advertisements, here represented by the segment 64 are generated at an access router, here the router 22-2, and communicated to a radio resource manager, here the radio resource manager 28-2. In the exemplary implementation, the router advertisement is configured to be sent only to the radio resource manager 28-2. Once delivered to the radio resource manager, the access router-generated signal detector 34 detects prefix information and the address configuration information from the router advertisement. Indications of the detected information are provided to the broadcast selector 36. The broadcast selector forwards the information, here indicated by the segment 68, to a base transceiver station, and the base transceiver broadcasts the information, indicated by the segment 72, to the mobile node. The mobile node detects the information and forms a care/of address, here indicated by the block 74.

Figure 3:
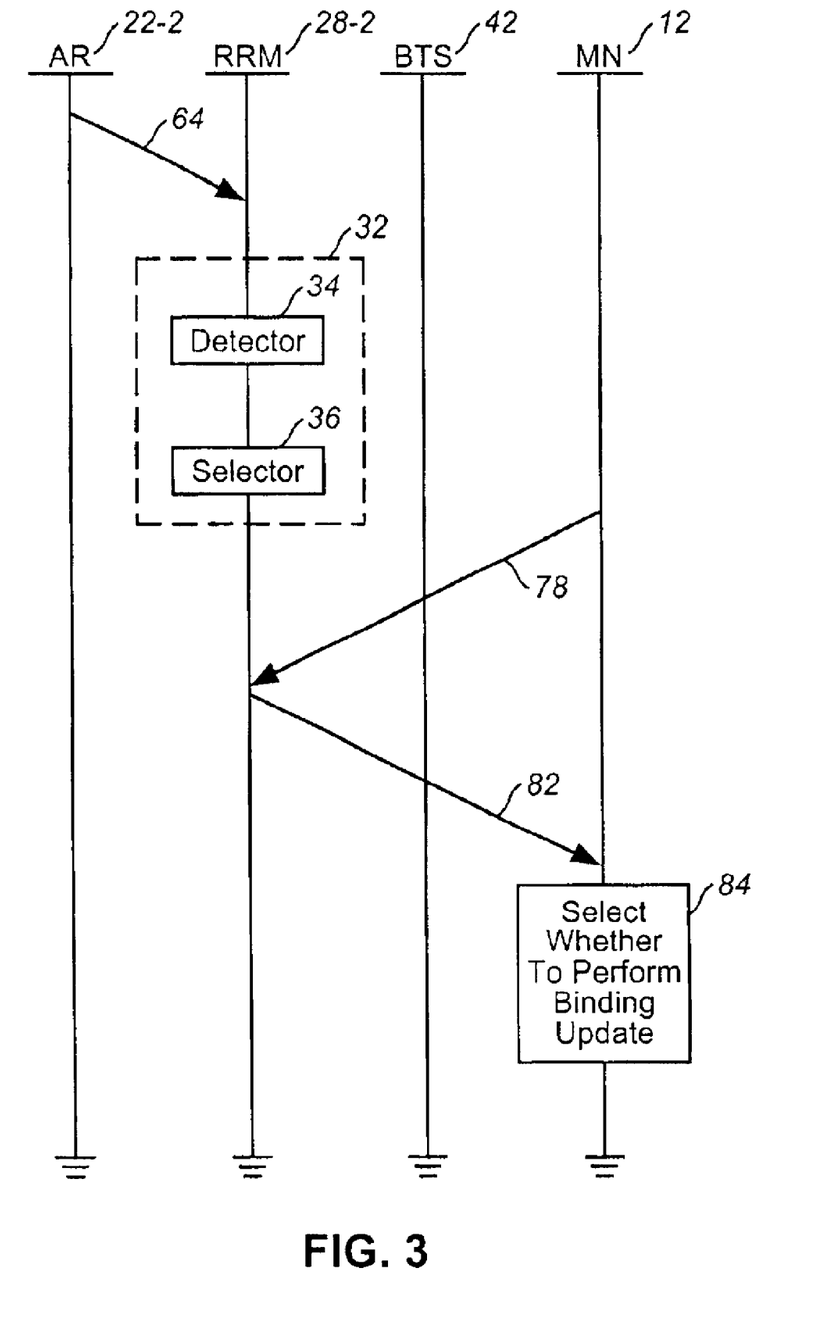
FIG. 3 illustrates another message sequence diagram listing signaling generated during operation of the communication system shown in FIG. 1 pursuant to another embodiment of the present invention.

FIG. 3 illustrates a message sequence diagram, shown generally at 76, of another embodiment of the present invention. Here, the access network router 22-2 again generates router advertisements that are communicated, again indicated by the segment 64, to the radio resource manager 28-2. And, detection of the identifying indicia and the address configuration information contained in the router advertisement is detected by the detector 34 and provided by way of the line 38 to a broadcast selector 36. The broadcast selector here maintains a record of the identifying indicia contained in the router advertisement. Subsequently, when a mobile node initiates a paging update procedure, here indicated by the segment 78, with a base transceiver station 42 of the radio access network, the identifying information of the sub-network and the address configuration information is forwarded, indicated by the segment 82, to the mobile node. The mobile node thereafter selectably initiates a binding update procedure, indicated by the block 84.

Figure 4:
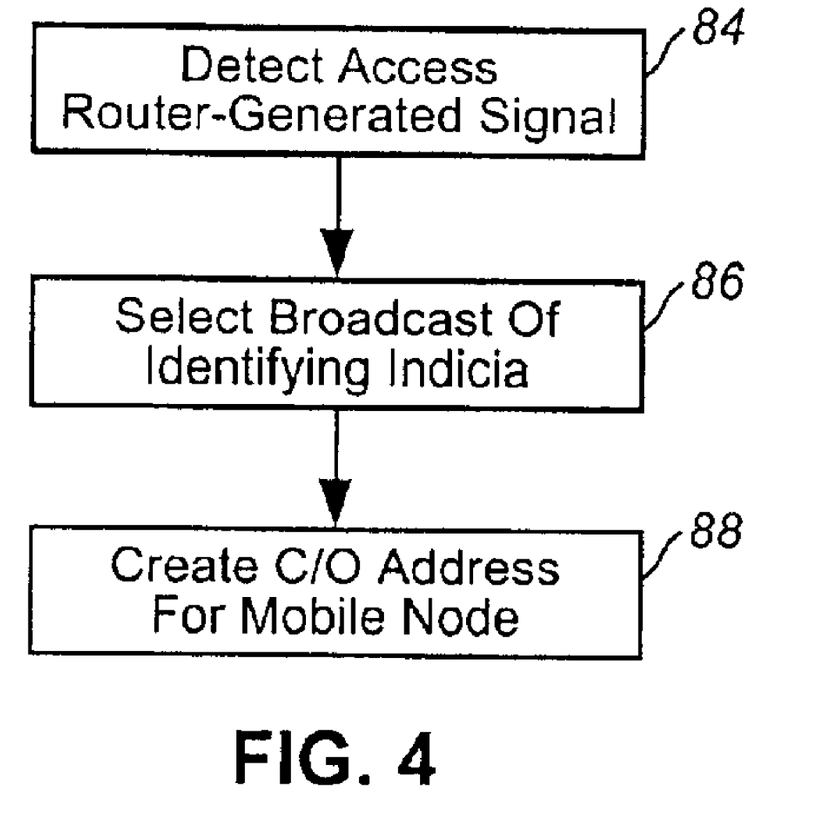
FIG. 4 illustrates a method flow diagram listing the method of operation of the method of an embodiment of the present invention.

FIG. 4 illustrates a method, shown generally at 82, of an embodiment of the present invention by which to provide a mobile node in a radio IP communication system with identifying indicia identifying the sub-network to which the mobile node attaches and the address configuration information. First, and as indicated by the block 84, detection is made of identifying indicia and the address configuration information contained in a router advertisement. Then, and as indicated by the block 86, the identifying indicia and the address configuration information are sent to the mobile node. The identifying indicia and the address configuration information are used at the mobile node to create, as indicated by the block 88, a care/of address identifying the forwarding address of the mobile node in a visited network.

The previous descriptions are of preferred examples for implementing the invention, and the scope of the invention should not necessarily be limited by this description. The scope of the present invention is defined by the following claims.

What is claimed is:

1. An apparatus for the radio resource manager for facilitating providing indications of the indicia to a mobile node positioned in at least a first access network area defined by the radio access network, said apparatus comprising:

an access router-generated signal detector coupled to the access router to receive the access router-generated signal generated at the access router-generated signal detector for detecting values of at least the indicia identifying the portion of the first radio access network; and a broadcast selector coupled to said access router-generated signal detector to receive indications of the values of the indicia detected at the broadcast selector selectably operable to initiate broadcast of the values of the indicia throughout the at least the first access network area.

2. The apparatus of claim 1 wherein the packet based radio communication system comprises a radio IP (Internet Protocol) communication system, and wherein the access router-generated signal generated by the access router and to which said access router-generated signal detector is coupled to receive, comprises a router advertisement.

3. The apparatus of claim 2 wherein the at least the first portion of the radio access network is identified by a prefix identifier and wherein the values or the at least the indicia identifying the portion of the first radio access network comprises the prefix identifier.

4. The apparatus of claim 1 wherein the access router-generated signal further comprises address configuration information, wherein said access router-generated signal detector further detects the address configuration information, and wherein said broadcast selector is further selectably operable to initiate broadcast of the address configuration information.

5. The apparatus of claim 1 wherein the access router-generated signal by the access router is configured to be routed only to the radio resource manager and wherein said access router-generated signal detector coupled to receive the access router-generated signal extracts portions of the access router-generated signal that form the values of the at least the indicia identifying the portion of the first radio access network.

6. The apparatus of claim 1 wherein the radio access network comprises at least a first base transceiver station, the first base transceiver station defining at least a portion of the first paging area, wherein said broadcast selector is coupled to the first base station and wherein broadcast of the values of the indicia initiated by said broadcast selector comprises providing the values of the indicia to the first base station.

7. The apparatus of claim 6 wherein said broadcast selector further causes broadcast of the values of the indicia by the first base transceiver station throughout the first access network area.

8. The apparatus of claim 7 wherein a first access network area identifier is associated with the first access network area, wherein the first access network area identifier is selectably broadcast throughout the first access network area, and wherein the values of the indicia are caused by said broadcast selector to be broadcast throughout the first access network area together with the first access network area identifier.

9. The apparatus of claim 8 wherein the packet-based radio communication system defines a broadcast channel and wherein the values of the indicia and the first access network area identifier are broadcast throughout the first access network area upon the broadcast channel.

10. In the radio communication system of claim 1, a further improvement of apparatus for the mobile node, said apparatus comprising:
a detector coupled to receive indications of the values of the indicia broadcast throughout the at least the first access network area; and
a care/of address creator coupled to said detector, said care/of address creator for creating a care/of address identifying the mobile node when positioned at the first access network area.

11. The apparatus of claim 1 wherein the at least the first access network area comprises the first access network area and at least a second access network area and wherein the broadcast of the values of the indicia selectably initiated by said broadcast selector occurs subsequent to movement of the mobile node into the first access network area from the at least the second access network area.

12. The apparatus of claim 11 wherein the mobile node generates a access network area update request when the mobile node moves out or the at least the second paging area and into the first paging area.

13. The apparatus of claim 12 wherein said broadcast selector initiates the broadcast of the values of the indicia responsive to generation of the access network area update request generated by the mobile node.

14. The apparatus of claim 1 wherein the broadcast initiated by said broadcast selector is initiated at selected intervals, the selected intervals less frequent than generation of the access router-generated signal.

15. A method for facilitating providing indications of the indicia to a mobile node positioned in at least a first paging area defined by the radio access network, said method comprising:
detecting at the radio resource manager, values of at least the indicia identifying the portion of the first radio access network; and
selectably initiating broadcast of the values of the indicia detected during said operation of detecting throughout the at least the first paging area.

16. The method of claim 15 further comprising the operation, prior to said operation of detecting, of providing the access router-generated signal to the radio resource manager.

17. The method of claim 15 wherein the access router-generated signal comprises a router advertisement containing an IP prefix identifier that identifies a sub-network defined by the access router and wherein said operation of detecting comprises detecting the IP prefix identifier contained in the router advertisement.

18. The method of claim 15 wherein the radio access network comprises at least a first base transceiver station defining at least a portion of the first paging area, and wherein said operation of selectably initiating broadcast comprises providing the values of the indicia to the first base transceiver station.

19. The method of claim 18 wherein said operation of selectably initiating broadcast further comprises the operation of broadcasting the values of the indicia from the at least the first base transceiver station.

20. The method of claim 19 wherein a first paging area identifier is associated with the first paging area, wherein the first paging area identifier is selectably broadcast throughout the first paging area and, wherein the values of the indicia broadcast during said operation of broadcasting are broadcast together with broadcast of the first paging area identifier.

21. The method of claim 15 wherein the at least the first paging area comprises the first paging area and at least a second paging area and wherein broadcast or the values of the indicia whose broadcast is selectably initiated during said operation of selectably initiating broadcast is performed subsequent to movement of the mobile node into the first paging area from the at least the second paging area.

22. The method of claim 21 wherein the mobile node generates a paging area update request when the mobile node moves out of the at least the second paging area and into the first paging area and wherein the broadcast of the values of the indicia is initiated responsive to generation of the paging area update request.

23. A method of communication in a wireless packet switched communications network, the network comprising a first access network and an access router associated with the first access network, the first access network comprising an entity adapted to store information received from the access router, the method comprising the steps of:

transmitting an identifier identifying at least portion of the first access network from the access router to the entity;

detecting the identifier at the entity;

comparing the identifier with the information stored in the entity;

transmitting at least portion of said identifier from the entity to at least a first base station;

receiving at least part of the identifier in a mobile terminal creating a care of address identifying the mobile terminal using said identifier.

24. A method of claim 23, wherein there is no information received from the access router stored in the entity.

25. A method of claim 23, wherein the transmitting step is broadcast.

26. A method of claim 23, further comprising the step of storing at least a portion of the identifier to the entity.

27. A method of claim 23 further comprising the step of broadcasting at least portion of said identifier by said first base station throughout the area covered by the base station throughout the area covered by the base station.

28. A method of claim 23, wherein the identifier is a router advertisement.

29. A method of claim 23, wherein the identifier comprises an IP prefix identifier.

30. A method of claim 23, wherein the identifier further comprises address auto-configuration information.

31. A method of claim 23, wherein the transmitting step of claim 23 is performed on a different frequency as the transmitting step of claim 23.

32. A method of claim 23, wherein the entity comprises a radio resource manager.

\* \* \* \* \*